US012800481B2

(12) United States Patent
Sakamoto et al.

(10) Patent No.: US 12,800,481 B2
(45) Date of Patent: Nov. 17, 2026

(54) GAS ABSORPTION SPECTROSCOPY DEVICE

(71) Applicant: SHIMADZU CORPORATION, Kyoto (JP)

(72) Inventors: Junki Sakamoto, Kyoto (JP); Yuta Kawashima, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 100 days.

(21) Appl. No.: 18/597,175

(22) Filed: Mar. 6, 2024

(65) Prior Publication Data

US 2024/0302269 A1 Sep. 12, 2024

(30) Foreign Application Priority Data

Mar. 10, 2023 (JP) ................................ 2023-037332

(51) Int. Cl.
*G01N 21/31* (2006.01)

(52) U.S. Cl.
CPC ... *G01N 21/31* (2013.01); *G01N 2201/06113* (2013.01)

(58) Field of Classification Search
CPC ......... G01N 21/31; G01N 2201/06113; G01N 2021/391; G01N 2021/399; G01N 21/39
See application file for complete search history.

(56) References Cited

U.S. PATENT DOCUMENTS

| | | | | |
|---|---|---|---|---|
| 5,903,358 | A * | 5/1999 | Zare | G01N 21/39 250/343 |
| 10,895,528 | B2 | 1/2021 | Mazzotti et al. | |
| 2012/0154815 | A1* | 6/2012 | Li | G01N 21/55 356/445 |
| 2018/0275049 | A1* | 9/2018 | Mazzotti | G01N 21/3504 |
| 2021/0389235 | A1* | 12/2021 | Mano | G01N 21/1717 |
| 2022/0011221 | A1* | 1/2022 | Yoshida | G01J 3/26 |

OTHER PUBLICATIONS

Galli, lacopo, et al. "Spectroscopic detection of radiocarbon dioxide at parts-per-quadrillion sensitivity." Optica vol. 3, No. 4 (2016): pp. 385-388.

Sonnenschein, Volker, et al. "A cavity ring-down spectrometer for study of biomedical radiocarbon-labeled samples." Journal of Applied Physics 124, 033101 (2018).

* cited by examiner

*Primary Examiner* — Tarifur R Chowdhury
*Assistant Examiner* — Carlos Perez-Guzman
(74) *Attorney, Agent, or Firm* — Muir Patent Law, PLLC

(57) ABSTRACT

A gas absorption spectroscopy device includes a laser light source, an acousto-optic modulator, a resonator, a signal detector, and a controller that measures a concentration of a target component in a gas provided in the resonator based on an attenuation time constant of a ring-down signal. The acousto-optic modulator is switchable between an ON state in which first order light is output to the resonator and an OFF state in which the first order light is not output to the resonator and the zeroth order light is output to outside. The gas absorption spectroscopy device further includes a timing detector that detects an intensity of the zeroth order light of the acousto-optic modulator. The controller determines the starting point of the ring-down signal based on an output signal of the timing detector.

6 Claims, 7 Drawing Sheets

GAS ABSORPTION SPECTROSCOPY DEVICE

CROSS REFERENCE TO RELATED APPLICATIONS

This nonprovisional application is based on Japanese Patent Application No. 2023-037332 filed on Mar. 10, 2023 with the Japan Patent Office, the entire contents of which are hereby incorporated by reference.

BACKGROUND OF THE INVENTION

Field of the Invention

The present disclosure relates to a gas absorption spectroscopy device for finding a concentration of a target component in a gas using a cavity ring-down spectroscopy (CRDS) method, which is one type of gas absorption spectroscopy methods.

Description of the Background Art

The cavity ring-down spectroscopy (CRDS) method has been known as one of the gas absorption spectroscopy methods. The CRDS is such a spectroscopy method that a resonator (cavity) including a high-reflectivity mirror is used to provide a long effective optical path length for light absorption by a gas, thereby finding a concentration of a target component in the gas with high sensitivity. In the CRDS, the concentration of the target component in the gas is measured in accordance with an attenuation time constant of a ring-down signal (light-intensity signal attenuated due to loss by leakage from reflection by the mirror and due to light absorption by the gas) generated when light to be input to the resonator is blocked after the light (laser light) is accumulated in the resonator. Specifically, when a small amount of gas is introduced into the resonator, if the wave number of the laser light and the absorption wave number of the gas coincide with each other, light absorption by the gas occurs, thus resulting in a short attenuation time of the ring-down signal. This principle is used to measure the concentration of the target component in the gas in accordance with the attenuation time constant of the ring-down signal. Since the attenuation time constant of the ring-down signal is not affected by instability of the light intensity, high-precision concentration measurement can be implemented.

Switching (blocking of the light to be input to the resonator) for generating the ring-down signal requires a response speed faster than the attenuation time of the ring-down signal. Therefore, the switching for generating the ring-down signal is normally performed using an acousto-optic modulator (AOM), which is a high-speed switching element. Specifically, the intensity of the light extracted from the resonator is always monitored by a signal detector disposed behind the resonator, and when the output signal of the signal detector exceeds a threshold value, a blocking signal is transmitted to the acousto-optic modulator to bring the acousto-optic modulator into a light blocking state, thereby generating the ring-down signal (see, for example, "A cavity ring-down spectrometer for study of biomedical radiocarbon-labeled samples", Journal of Applied Physics 124, 033101).

Further, a cavity ring-down spectroscopy method that employs saturated absorption has been also known (for example, see U.S. Pat. No. 10,895,528, and IACOPO GALLI et al., "Spectroscopic detection of radiocarbon dioxide at parts-per-quadrillion sensitivity", Vol. 3, No. 4/April 2016/Optica). In the cavity ring-down spectroscopy method that employs saturated absorption, the attenuation time constant of the resonator and the attenuation time constant of the gas absorption can be measured simultaneously and separately in accordance with the ring-down signal by employing such a fact that the saturated absorption is non-linear absorption. Thus, in the cavity ring-down spectroscopy method that employs the saturated absorption, an influence of instability of the laser light source or the resonator can be suppressed, with the result that the measurement can be performed with higher sensitivity.

SUMMARY OF THE INVENTION

As described above, in the CRDS, when the output signal of the signal detector exceeds the threshold value, the blocking signal is transmitted to the acousto-optic modulator to bring the acousto-optic modulator into the light blocking state, thereby measuring (generating) the ring-down signal.

The ring-down signal needs to be measured in a state in which the light to be input to the resonator is completely blocked. However, there is a time lag (time distribution) between the transmission of the blocking signal to the acousto-optic modulator and the actual and complete light blocking by the acousto-optic modulator. In order to address this, conventionally, a point of time at which a predetermined delay time (constant time) has elapsed from a time at which the output signal of the signal detector has exceeded the threshold value is set as the starting point of the ring-down signal.

However, since the light blocking by the acousto-optic modulator is not detected in the conventional method using the delay time, it is necessary to set the delay time to be long in order to ensure that the acousto-optic modulator securely blocks the light, with the result that the starting point of the ring-down signal is lagged behind a timing at which the light blocking is actually started. As a result, a signal of a portion having a large intensity immediately after the light blocking is not included in the ring-down signal, with the result that an SN ratio (signal-to-noise ratio) of the ring-down signal tends to be deteriorated.

The present invention has been made to solve such a problem and has an object to improve an SN ratio of a ring-down signal used in a cavity ring-down spectroscopy method.

A gas absorption spectroscopy device according to the present disclosure is a gas absorption spectroscopy device for measuring a target component in a gas using a cavity ring-down spectroscopy method, the gas absorption spectroscopy device including: a resonator including at least two mirrors; a light source that emits laser light to irradiate the resonator with the laser light; a first detector that detects light from the resonator; an acousto-optic modulator disposed in an optical path between the light source and the resonator, the acousto-optic modulator being switchable between an ON state in which the laser light from the light source is output to the resonator and an OFF state in which the laser light from the light source is not output to the resonator; and a control unit that acquires, as a ring-down signal to be used to measure the target component, an output signal of the first detector after the acousto-optic modulator is switched from the ON state to the OFF state. The acousto-optic modulator outputs first order light to the resonator in the ON state and outputs zeroth order light to the outside in the OFF state. The gas absorption spectroscopy device further includes a second detector that detects an intensity of the zeroth order light. The control unit determines a starting point of the ring-down signal based on an output signal of the second detector.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
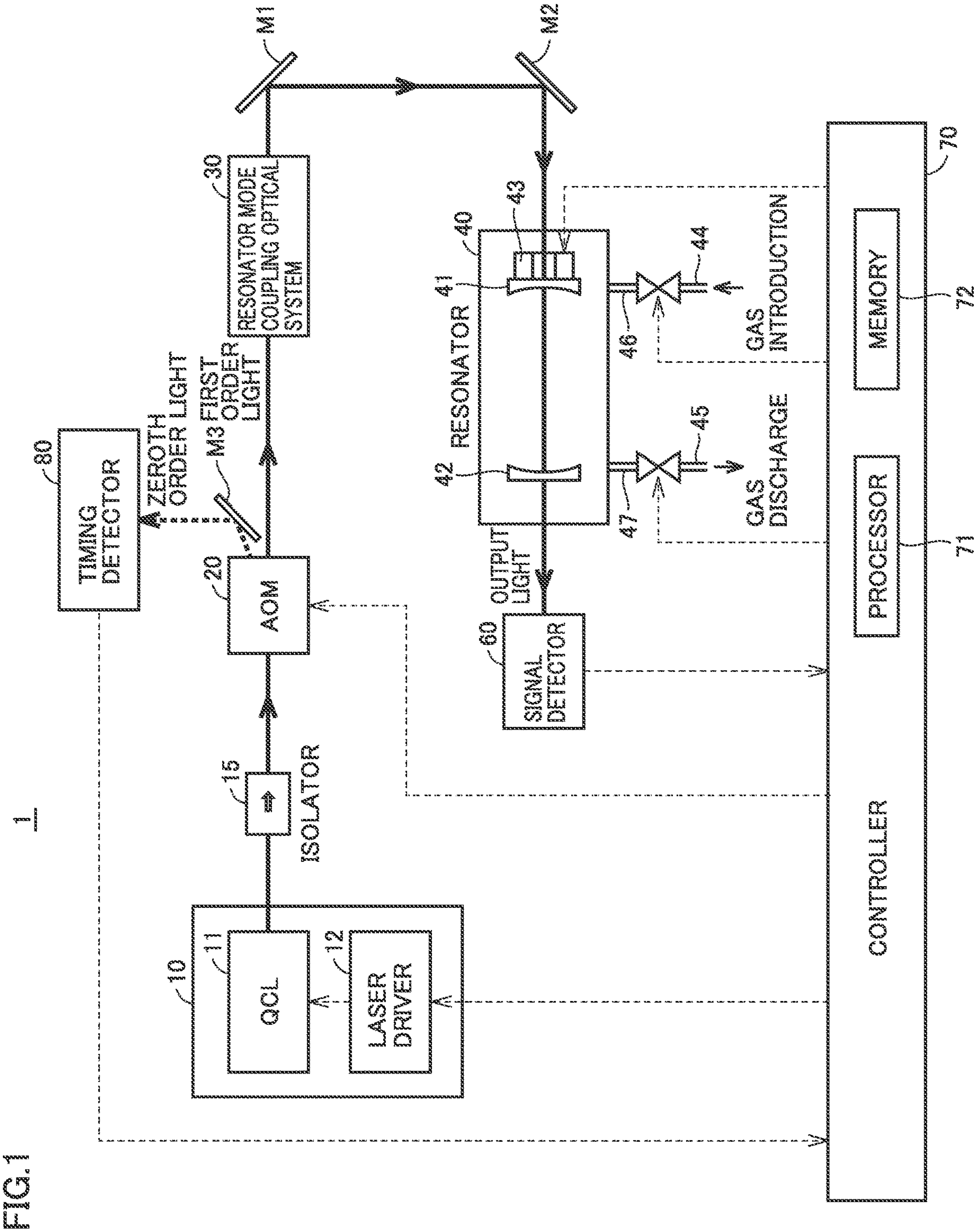
FIG. 1 is a first diagram schematically showing an overall configuration of a gas absorption spectroscopy device.

Hereinafter, the present embodiment will be described in detail with reference to figures. It should be noted that in the description below, the same or corresponding portions in the figures are denoted by the same reference characters and will not be described repeatedly.

System Configuration

FIG. 1 is a diagram schematically showing an overall configuration of a gas absorption spectroscopy device 1 according to the present embodiment. Gas absorption spectroscopy device 1 is configured to measure light absorption by a target component in a gas (sample gas) in accordance with a cavity ring-down spectroscopy (CRDS) method. It should be noted that gas absorption spectroscopy device 1 according to the present embodiment is assumed to quantify an abundance ratio of $^{14}CO_2$ among three types of isotopes ($^{12}CO_2$, $^{13}CO_2$, $^{14}CO_2$) of carbon dioxide with different masses of carbon. It should be noted that the natural abundance ratio of $^{14}CO_2$ ($={}^{14}CO_2/({}^{12}CO_2+{}^{13}CO_2+{}^{14}CO_2)$) is on the order of $10^{-12}$ and is very low.

Gas absorption spectroscopy device 1 includes a laser light source 10, an isolator 15, an acousto-optic modulator (AOM) 20, a resonator mode coupling optical system 30, a resonator 40, mirrors M1, M2, a signal detector 60, and a controller 70.

Laser light source 10 emits laser light to irradiate resonator 40 with the laser light. Laser light source 10 is configured to change an oscillation frequency of the laser light in accordance with a command from controller 70. Specifically, laser light source 10 includes a distributed feedback quantum cascade laser (QCL) 11 and a laser driver 12. QCL 11 emits, for example, laser light having a center oscillation wave number of about 2200 $cm^{-1}$ (wavelength of about 4.5 μm). Laser driver 12 supplies a driving current to QCL 11 in accordance with a command from controller 70. By changing the driving current to be supplied to QCL 11, the oscillation wave number of QCL 11 can be swept by about 0.2 $cm^{-1}$, thereby covering absorption lines of $^{12}CO_2$, $^{13}CO_2$, and $^{14}CO_2$.

Isolator 15 is provided in an optical path between laser light source 10 and resonator 40. By disposing isolator 15 immediately after laser light source 10, instability of the laser wave number as caused by return light can be prevented.

AOM 20 is provided in the optical path between laser light source 10 and resonator 40. AOM 20 switches between irradiation and blocking of the laser light from laser light source 10 to resonator 40 in accordance with a command from controller 70.

When a command (hereinafter also referred to as an "AOM-ON signal") for irradiating with the light is applied from controller 70, AOM 20 is brought into an ON state in which first order light is output to resonator 40. It should be noted that first order light diffraction efficiency of AOM 20 when AOM 20 is in the ON state is about 85%, and there is substantially no higher order diffraction than second order diffraction. Therefore, when AOM 20 is in the ON state, about 85% of the light input from laser light source 10 to AOM 20 is output to resonator 40 as the first order light and is accumulated in resonator 40, whereas the remainder, i.e., about 15% of the light is output to outside as zeroth order light (light that is not diffracted in AOM 20 and that passes therethrough without change).

When a command (hereinafter, also referred to as an "AOM-OFF signal") for blocking the light is applied from controller 70, AOM 20 is brought into an OFF state in which the first order light is not output to resonator 40. That is, when AOM 20 is in the OFF state, the first order light diffraction efficiency of AOM 20 is about 0%, with the result that the laser light (first order light) from AOM 20 to irradiate resonator 40 is blocked. In other words, when AOM 20 is in the OFF state, about 100% of the light input from laser light source 10 to AOM 20 is output to the outside as the zeroth order light.

When AOM 20 is in the ON state, the first order light of AOM 20 passes through resonator mode coupling optical system 30, is then reflected by mirrors M1, M2, and is input to resonator 40. Resonator mode coupling optical system 30 includes one or more lenses or parabolic mirrors, and adjusts the laser light to form a beam waist inside resonator 40.

Resonator 40 is provided in an optical path between AOM 20 and signal detector 60. Resonator 40 includes a container (cell) in which a sample gas can be sealed, and has an introduction pipe 44 for introducing the sample gas thereinto before starting measurement, and a discharge pipe 45 for discharging the sample gas to the outside after ending the measurement. Introduction pipe 44 is provided with an introduction valve 46. Discharge pipe 45 is provided with a discharge valve 47. Opening and closing of each of introduction valve 46 and discharge valve 47 can also be controlled by controller 70.

Further, a pair of mirrors 41, 42 are provided inside resonator 40. Mirrors 41, 42 are disposed to face each other so as to reflect the light therebetween inside resonator 40. As each of mirrors 41, 42, a mirror having a recessed surface is employed in order to promote establishment of a stability condition for resonator 40. Also, as each of mirrors 41, 42, a mirror having a high reflectivity (for example, about 99.9%) is employed in order to attain very weak light that leaks to the outside of resonator 40. A resonator length (distance between mirrors 41, 42 in an optical axis direction) of resonator 40 is, for example, about 450 mm. It should be noted that the number of mirrors disposed inside resonator 40 is not limited to two, and may be three or more. That is, the resonator may be a resonator in which mirrors are disposed to reflect light therebetween, or may be a resonator in which mirrors are disposed in the form of a ring so as to reflect the light in one direction.

A piezo element (piezoelectric element) 43 is disposed at mirror 41. Piezo element 43 drives mirror 41 of resonator 40 in accordance with a command from controller 70 so as to displace mirror 41 in the optical axis direction. Thus, the resonator length of resonator 40 can be changed. Therefore, the resonator length can be changed to match the laser wave number, and the laser wave number can be swept to match the resonator length. It should be noted that the piezo element may be disposed at mirror 42 instead of mirror 41, or the piezo element may be disposed at each of mirror 41 and mirror 42.

Signal detector 60 is a photodetector such as a photodiode or an image sensor. Signal detector 60 detects, as output light of resonator 40, weak light having passed through and extracted from mirror 42 of resonator 40, and outputs a signal (detection signal) indicating a detection result to controller 70. For signal detector 60, a liquid-nitrogen-cooled InSb (indium antimony) detector may be employed, for example.

Controller 70 includes a processor 71 such as a CPU (Central Processing Unit) or an FPGA (Field-Programmable Gate Array), a memory 72 such as a ROM (Read Only Memory) or a RAM (Random Access Memory), and an input/output port (not shown).

Controller 70 controls each device included in gas absorption spectroscopy device 1. Specifically, controller 70 outputs, to laser driver 12, a command for scanning the oscillation frequency of the laser light, and outputs the AOM-ON signal or the AOM-OFF signal to AOM 20. Controller 70 outputs, to introduction valve 46, a command for introducing the sample gas into resonator 40, and outputs, to discharge valve 47, a command for discharging the sample gas to the outside of resonator 40. Controller 70 applies, to piezo element 43, a voltage for displacing mirror 41. Further, controller 70 performs various types of data processes to calculate the concentration (absolute concentration) of the target component in the sample gas based on the detection signal from signal detector 60.

It should be noted that controller 70 may be divided into two or more units for respective functions. For example, controller 70 may be divided into a unit that controls each device and a unit that performs the various types of data processes.

Principle of Measurement by Cavity Ring-Down Spectroscopy (CRDS) Method

A principle of measurement by the cavity ring-down spectroscopy (CRDS) method in gas absorption spectroscopy device 1 will be briefly described. Generally, the resonator has a resonance condition that resonance occurs when the frequency of irradiated light on the resonator is a specific frequency. When the frequency of the irradiated laser light on resonator 40 satisfies the resonance condition of resonator 40, the power of the laser light from laser light source 10 is accumulated in resonator 40.

Controller 70 determines whether or not the power of the laser light is sufficiently accumulated in resonator 40, in accordance with the output signal of signal detector 60 (output light of resonator 40). When the output light of resonator 40 reaches a predetermined threshold value th1, controller 70 determines that the power of the laser light is sufficiently accumulated in resonator 40, and outputs the AOM-OFF signal to AOM 20. Thus, the light to be input to resonator 40 is blocked by AOM 20. Accordingly, the light accumulated in resonator 40 is moved back and forth a multiplicity of times (normally, several thousand to several ten thousand times) between mirror 41 and mirror 42. This light is gradually attenuated by loss due to leakage from reflection by mirrors 41, 42 and absorption by the target component in the sample gas while the light is moved back and forth between mirrors 41, 42. Therefore, the leaked output light of resonator 40 from mirror 42 is gradually attenuated. In the CRDS, even when the light absorption by the target component is very small, the light absorption can be detected because a distance (effective optical path length) in which the light passes through the sample gas is made long by using resonator 40.

Controller 70 acquires, as the "ring-down signal", the output signal of signal detector 60 after blocking the light to be input to resonator 40 by AOM 20, and calculates an attenuation time constant of the acquired ring-down signal as a "ring-down time". Controller 70 calculates the concentration of the target component in the sample gas in accordance with the calculated ring-down time.

Controller 70 acquires the output signal of signal detector 60 at an interval of, for example, 0.2 μsec and calculates the ring-down time from the acquired output signal of signal detector 60. When no gas component that absorbs the laser light is present inside resonator 40, the ring-down time coincides with the attenuation time constant of resonator 40 and therefore is a substantially constant value. On the other hand, when a gas component that absorbs the laser light is present inside resonator 40, the ring-down time has a value that varies according to the concentration of the gas component. By using this point, the concentration of the target component can be quantified.

It should be noted that realistically, the ring-down time is not constant with respect to the laser wave number due to optical fringe noise (etalon effect). Therefore, by repeatedly calculating the ring-down signal at the wave number of each laser light, an absorption spectrum indicating a correspondence between the laser wave number and the ring-down signal can be obtained. By comparing the shape of the absorption spectrum and the known light absorption ratio of the gas, the concentration of the target component can be quantified.

Starting Point of Ring-Down Signal

As described above, the output signal of signal detector 60 after blocking the light to be input to resonator 40 by AOM 20 is acquired (generated) as the "ring-down signal".

The starting point of the ring-down signal is preferably a timing at which the complete light blocking by AOM 20 is actually started. However, there is a time lag between the transmission of the AOM-OFF signal from controller 70 to AOM 20 and the actual and complete light blocking by AOM 20. Therefore, conventionally, a timing after passage of a constant delay time from the timing of the transmission of the AOM-OFF signal is set as the starting point of the ring-down signal.

However, in the conventional method using the delay time, the SN ratio (signal-to-noise ratio) of the ring-down signal tends to be deteriorated. Hereinafter, this point will be described in detail.

Figure 2:
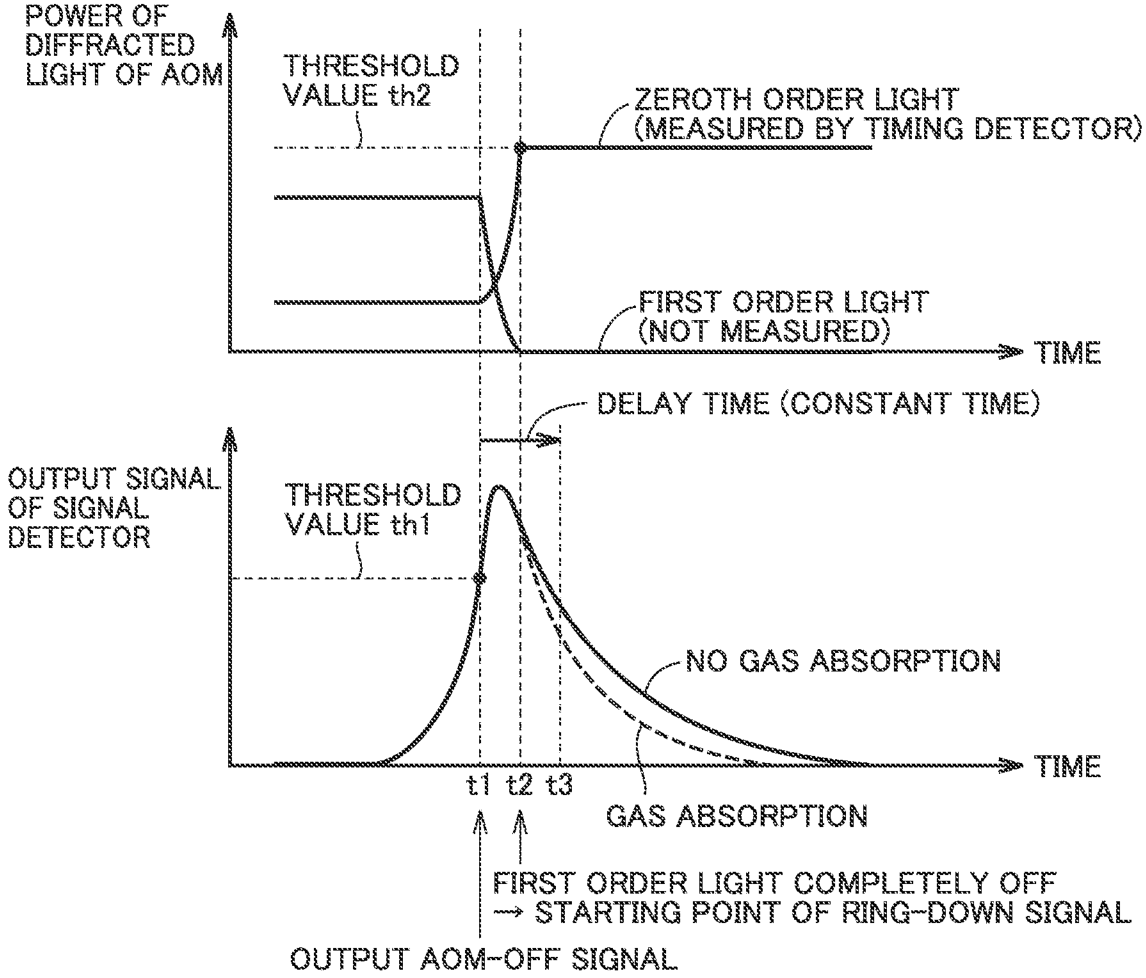
FIG. 2 is a first diagram schematically showing exemplary waveforms of power of diffracted light of an AOM and an output signal of a signal detector.

FIG. 2 is a diagram schematically showing exemplary waveforms of the power of the diffracted light of AOM 20 and the output signal of signal detector 60. Before a time t1, AOM 20 is in the ON state and the first order light of AOM 20 is input to resonator 40. Thus, the light is accumulated in resonator 40, thereby increasing the output signal of signal detector 60.

At a time t1 at which the output signal of signal detector 60 reaches threshold value th1, it is determined that the light is sufficiently accumulated in resonator 40, and the AOM-OFF signal is output to AOM 20. Thus, the first order light starts to be decreased and is completely turned off (0%) at a subsequent time t2. At this time t2, the laser light to be newly input to resonator 40 is completely blocked. Therefore, it is desirable that the starting point of the ring-down signal is time t2.

However, there is a time lag between time t1 at which the AOM-OFF signal is output to AOM 20 and time t2 at which the laser light to be newly input to resonator 40 is actually blocked completely. In consideration of this time lag, conventionally, a time t3 after passage of a predetermined delay time (constant time) from time t1 is set as the starting point of the ring-down signal.

However, in the conventional method using the delay time as described above, it is necessary to set a long delay time in order to ensure that AOM 20 securely blocks the light, with the result that the starting point of the ring-down signal tends to be lagged behind the timing at which the light blocking by AOM 20 is actually started. As a result, a signal during a period of time just after the light blocking, i.e., period of time from time t2 to time t3 during which the intensity is high is not included in the ring-down signal, with the result that the S/N ratio of the ring-down signal tends to be deteriorated.

In order to solve such a problem, in the present embodiment, the starting point of the ring-down signal is determined based on the intensity of the zeroth order light output from AOM 20. Specifically, gas absorption spectroscopy device 1 according to the present embodiment includes a mirror M3 and a timing detector 80 as configurations for detecting the zeroth order light of AOM 20.

The zeroth order light of AOM 20 is reflected by mirror M3 and is input to timing detector 80. As with signal detector 60, timing detector 80 is a photodetector such as a photodiode or an image sensor. Signal detector 60 detects the intensity of the zeroth order light of AOM 20 and outputs a signal indicating a detection result to controller 70.

Before time t1, AOM 20 is in the ON state, and about 85% of the light input from laser light source 10 to AOM 20 is the first order light and the remainder, i.e., about 15% thereof is the zeroth order light.

When the AOM-OFF signal is output to AOM 20 at time t1, the first order light starts to be decreased and the zeroth order light starts to be increased. At time t2 at which the first order light becomes zero, the zeroth order light reaches substantially the same level as the intensity of the laser light output by laser light source 10.

In view of this point, controller 70 determines whether or not the first order light is zero, based on the output signal (the intensity of the zeroth order light) of timing detector 80. For example, controller 70 sets, as the starting point of the ring-down signal, time t2 at which the output signal (the intensity of the zeroth order light) of timing detector 80 reaches a threshold value th2 that is substantially the same as the intensity of the laser light output by laser light source 10.

Figure 3:
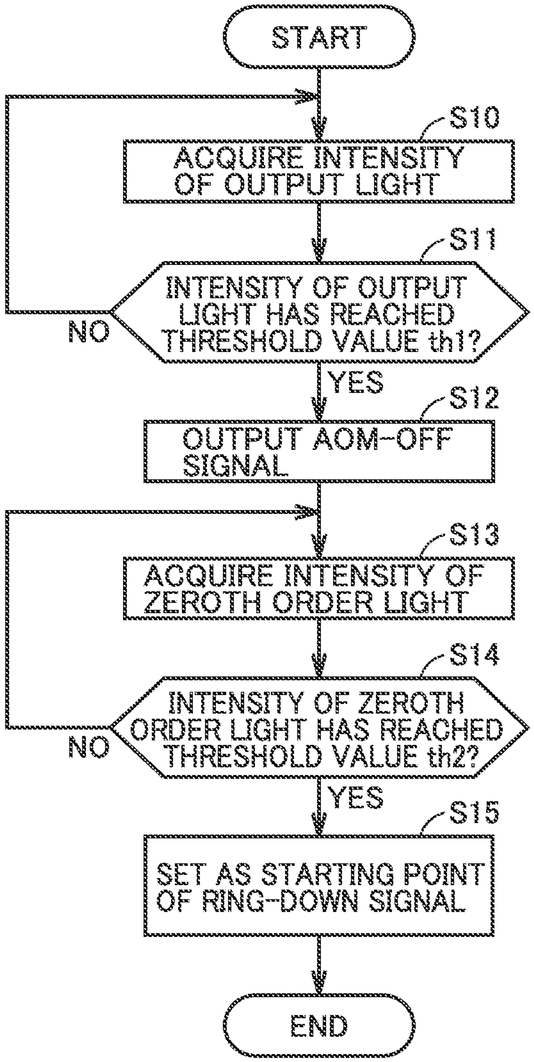
FIG. 3 is a flowchart showing an exemplary processing procedure of a controller.

FIG. 3 is a flowchart showing an exemplary processing procedure performed when controller 70 determines the starting point of the ring-down signal. This flowchart is started at a point of time at which the AOM-ON signal is output to AOM 20.

First, controller 70 acquires the intensity of the output light of resonator 40 (the output signal of signal detector 60) (step S10).

Next, controller 70 determines whether or not the intensity of the output light of resonator 40 has reached threshold value th1 (step S11). When the intensity of the output light has not reached threshold value th1 (NO in step S11), controller 70 returns the process to step S10.

When the intensity of the output light has reached threshold value th1 (YES in step S11), controller 70 outputs the AOM-OFF signal to AOM 20 (step S12).

Then, controller 70 acquires the intensity of the zeroth order light of AOM 20 (output signal of timing detector 80) (step S13).

Next, controller 70 determines whether or not the intensity of the zeroth order light has reached threshold value th2 (step S14). When the intensity of the zeroth order light has not reached threshold value th2 (NO in step S14), controller 70 returns the process to step S13.

When the intensity of the zeroth order light has reached threshold value th2 (YES in step S14), controller 70 sets, as the starting point of the ring-down signal, the point of time at which the intensity of the zeroth order light has reached threshold value th2 (step S15).

As described above, gas absorption spectroscopy device 1 according to the present embodiment includes timing detector 80 that detects the intensity of the zeroth order light output from AOM 20. Controller 70 sets, as the starting point of the ring-down signal, the point of time at which the output signal of timing detector 80 has reached threshold value th2. Thus, the starting point of the ring-down signal can be closer to the timing at which the complete light blocking by AOM 20 is actually started, than that in the conventional method using the delay time. As a result, the S/N ratio of the ring-down signal can be improved, thereby further improving precision in concentration measurement.

Laser light source 10, AOM 20, resonator 40, signal detector 60, controller 70, and timing detector 80 according to the present embodiment can respectively correspond to the "light source", the "acousto-optic modulator", the "resonator", the "first detector", the "control unit" and the "second detector" of the present disclosure.

Modification 1

In the above-described embodiment, it has been illustratively described that the method of determining the starting point of the ring-down signal based on the intensity of the zeroth order light of AOM 20 is applied to the cavity ring-down spectroscopy (CRDS) method that does not use saturated absorption. However, the above method is applicable to CRDS that uses the saturated absorption.

Since the saturated absorption, which is a nonlinear absorption phenomenon, is promoted to be caused by increasing the power density of the light accumulated in the resonator, it is important to increase the power of the laser light and increase a resonator coupling ratio of the laser light. Therefore, in order to stably cause the saturated absorption, it is necessary to stabilize the laser oscillation wave number and stabilize the resonator coupling ratio. As a method of stabilizing the laser wave number, it is desirable to apply, for example, a PDH (Pound Drever Hall) method or the like.

Figure 4:
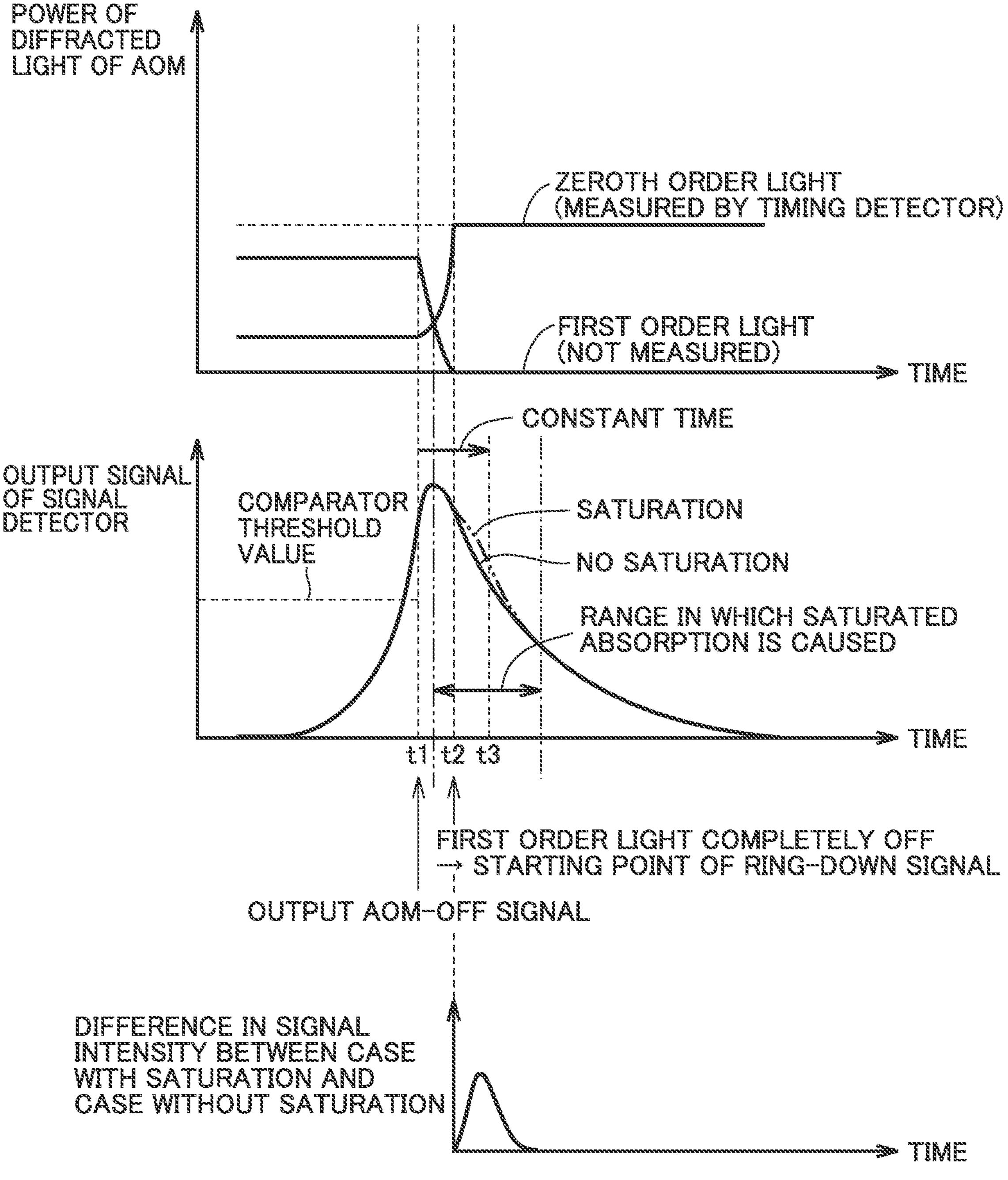
FIG. 4 is a second diagram schematically showing the exemplary waveforms of the power of the diffracted light of the AOM and the output signal of the signal detector.

FIG. 4 is a diagram schematically showing exemplary waveforms of the power of the diffracted light of AOM 20 and the output signal of signal detector 60 in gas absorption spectroscopy device 1 according to modification 1. Gas absorption spectroscopy device 1 according to modification 1 measures the concentration of the target component in the sample gas by the cavity ring-down spectroscopy method that uses the saturated absorption. The other configurations of gas absorption spectroscopy device 1 according to modification 1 are the same as those of gas absorption spectroscopy device 1 according to the above-described embodiment.

As described above, the saturated absorption is promoted to be caused when the power density of the light in resonator 40 is high. Since the light absorption ratio of the gas is decreased at the time of saturation, the attenuation component of the ring-down signal mainly results from attenuation due to normal absorption and attenuation due to resonator 40 when the intensity of the ring-down signal is large.

While the saturated absorption is caused, an amount of absorption is small with respect to the gas concentration, whereas while no saturated absorption is caused, only normal absorption occurs. Therefore, as shown in FIG. 4, while the saturated absorption is caused, the waveform of the ring-down signal in the case of the saturation slightly protrudes upward as compared with the waveform of the ring-down signal in the case of no saturation, and then becomes the same as the waveform of the ring-down signal in the case of no saturation. Therefore, by measuring a difference between both the signals, the attenuation time constant of resonator 40 and the attenuation time constant of the gas absorption can be simultaneously measured separately, with the result that the measurement can be performed with the optical fringe noise being separated. In order to precisely measure the difference, it is effective to acquire a larger number of signals in a state in which the SN ratio is high immediately after the light blocking by AOM 20 (period of time during which the saturated absorption is caused). Therefore, the method of determining the starting point of the ring-down signal based on the intensity of the zeroth order light of AOM 20 is very effective for the CRDS using the saturated absorption.

Modification 2

In the above-described embodiment, it has been illustratively described that the starting point of the ring-down signal is determined under a condition that the intensity of the zeroth order light of AOM 20 has reached threshold value th2. However, the condition for determining the starting point of the ring-down signal is not limited thereto.

Since it is necessary to sweep the driving current to be supplied to QCL 11 in order to sweep the oscillation wave number of the laser light emitted by laser light source 10, the intensity of the laser light emitted by laser light source 10 is also changed in response to the sweeping of the driving current. Therefore, even if AOM 20 is fixed to the ON state or the OFF state, the intensity of the zeroth order light of AOM 20 is not always a constant value.

In consideration of this point, a first order differential value of the intensity of the zeroth order light of AOM 20 is found and the starting point of the ring-down signal may be determined under a condition that the first order differential value of the intensity of the zeroth order light is changed in a predetermined manner.

Figure 5:
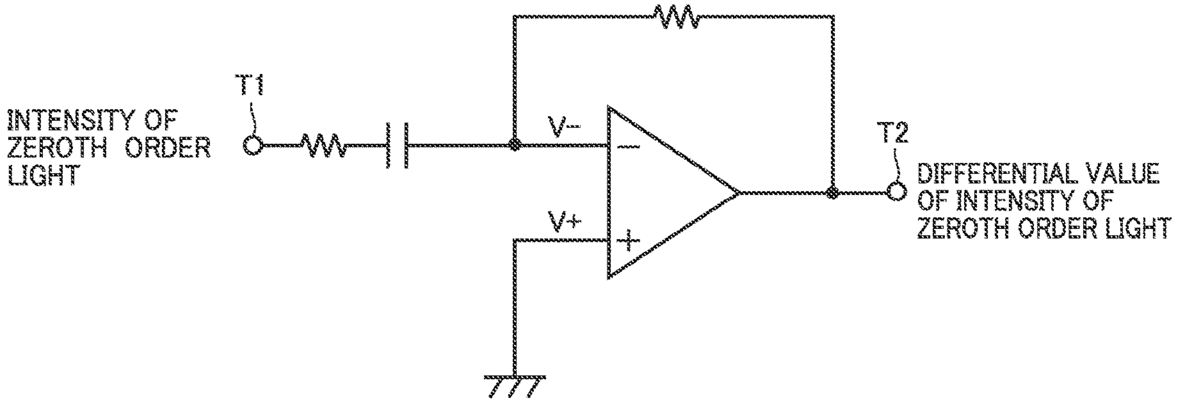
FIG. 5 is a diagram showing an exemplary differentiation circuit that outputs a first order differential value of an intensity of zeroth order light of the AOM.

FIG. 5 is a diagram showing an exemplary differentiation circuit that outputs the first order differential value of the intensity of the zeroth order light of AOM 20. In the differentiation circuit shown in FIG. 5, when a voltage signal indicating the intensity of the zeroth order light of AOM 20 is input to an input terminal T1, a voltage signal indicating the first order differential value of the intensity of the zeroth order light of AOM 20 is output from an output terminal T2.

Figure 6:
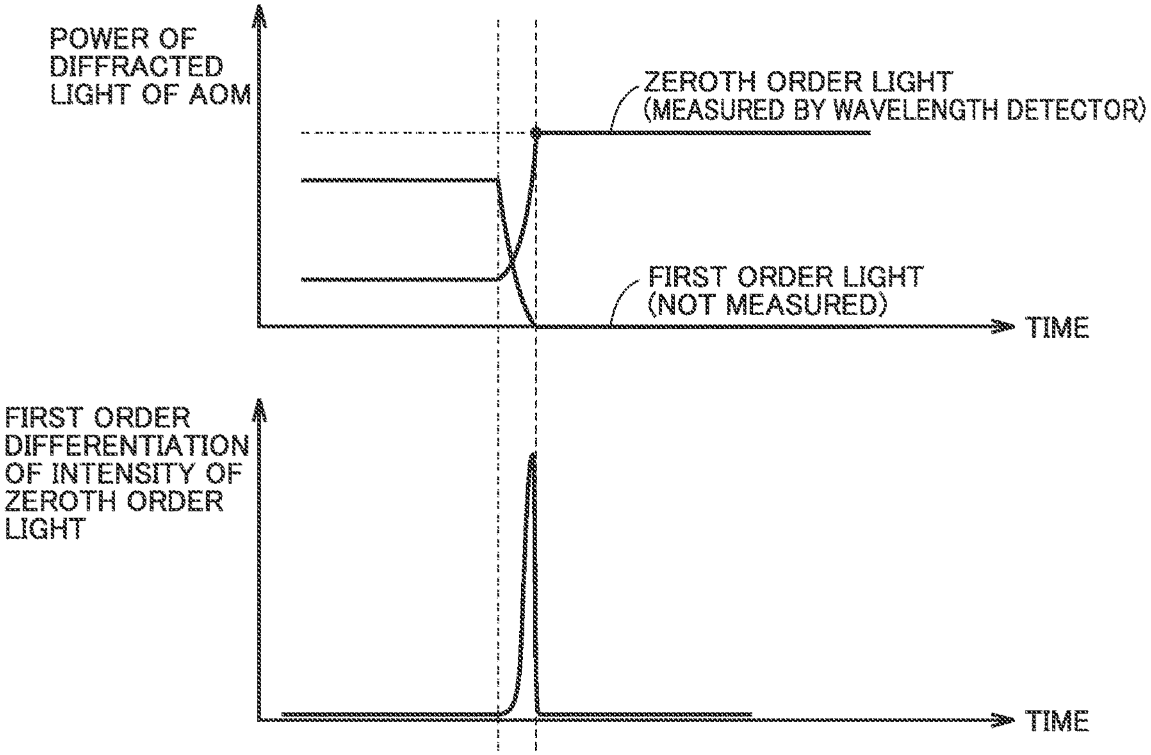
FIG. 6 is a diagram schematically showing an exemplary waveform of the first order differential value of the intensity of the zeroth order light of the AOM.

FIG. 6 is a diagram schematically showing an exemplary waveform of the first order differential value of the intensity of the zeroth order light of AOM 20. When the output signal of the differentiation circuit shown in FIG. 5 is changed in a manner shown in FIG. 6, it can be determined that the first order light of AOM 20 is blocked. For example, controller 70 may determine that the first order light of AOM 20 is completely blocked, when the output signal (the first order differential value of the intensity of the zeroth order light) of the differentiation circuit is monotonically increased, is then monotonically decreased, and falls below a threshold value.

Modification 3

In gas absorption spectroscopy device 1 described above, it is necessary to monitor the intensities of the plurality of absorption lines existing within a narrow wavelength range. Further, since the laser wavelength is not constant due to the drift or fluctuation of the oscillation wavelength, it is necessary to always monitor the laser wavelength.

Conventionally, part of the laser light is partially extracted using a beam splitter or the like, and the intensity of the laser light having passed through a gas cell having a known absorption wavelength is measured to calculate a current laser wavelength. However, conventionally, since it is necessary to extract part of the laser light, the laser light to be input to the resonator is decreased. Therefore, the intensity of the output light of the resonator is decreased, thereby affecting the lower limit of the concentration measurement, disadvantageously.

To address this, the zeroth order light of AOM 20 that does not affect the concentration measurement may be used to measure the laser wavelength.

Figure 7:
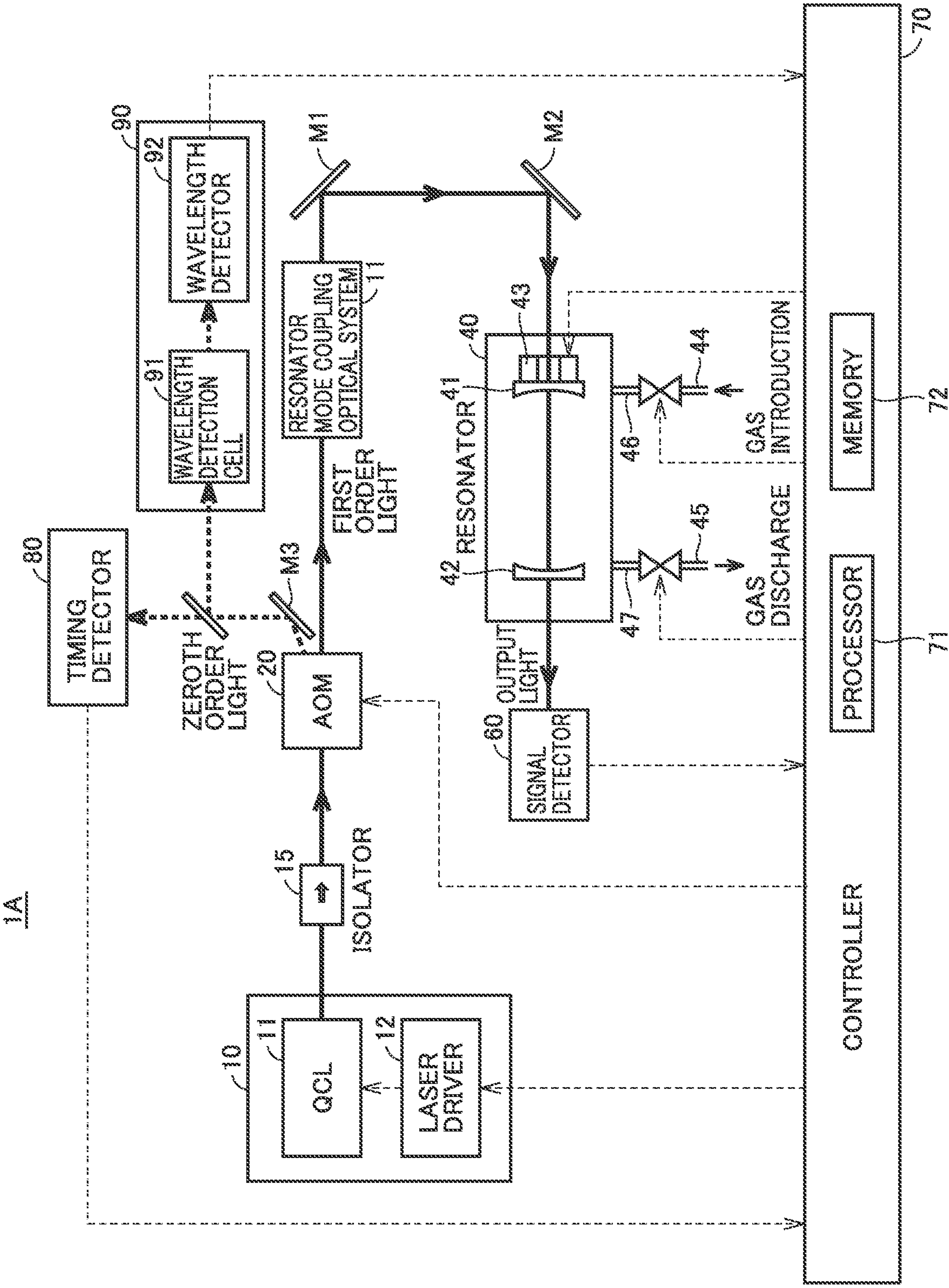
FIG. 7 is a second diagram schematically showing the overall configuration of the gas absorption spectroscopy device.

FIG. 7 is a diagram schematically showing an overall configuration of a gas absorption spectroscopy device 1A according to a modification 3. Gas absorption spectroscopy device 1A according to modification 3 is obtained by adding a wavelength detection device 90 to gas absorption spectroscopy device 1 described above. The other configurations of gas absorption spectroscopy device 1A are the same as those of gas absorption spectroscopy device 1 described above.

Wavelength detection device 90 includes a wavelength detection cell 91 and a wavelength detector 92. As wavelength detection cell 91, for example, a cell provided with $N_2O$ is used. $N_2O$ has a plurality of peaks within the wave number sweeping range required for $^{14}CO_2$ quantitation, and is therefore suitable to measure an absolute wavelength. It should be noted that a cell including $N_2O$ and other gas(es) may be used for wavelength detection cell 91.

Wavelength detector 92 is, for example, an InAsSb (indium-arsenic-antimony) detector. Wavelength detector 92 detects the wavelength of the zeroth order light of AOM 20 having passed through wavelength detection cell 91.

As described above, the zeroth order light of AOM 20 may be used to measure the laser wavelength. In this way, the laser wavelength can be measured without affecting the concentration measurement. That is, when AOM 20 is in the ON state, 85% of the light input from laser light source 10 to AOM 20 is output to resonator 40 as the first order light, and the remainder, i.e., 15% of the light is output to the outside as the zeroth order light. In view of this point, the wavelength of the 15% zeroth order light output from AOM 20 is detected by wavelength detection device 90 in the state in which AOM 20 is in the ON state, with the result that the wavelength of the first order light input to resonator 40 can be detected without additionally splitting the first order light by a splitter or the like.

It should be noted that wavelength detection device 90 may include no wavelength detection cell. For example, a wavelength detector may be employed which is constituted of an interferometer or an optical heterodyne detector formed between laser light source 10 and a reference laser light source (not shown).

IMPLEMENTATIONS

It is understood by those skilled in the art that the above-described embodiment and modifications thereof are specific examples of the following implementations.

(Item 1) A gas absorption spectroscopy device according to the present disclosure is a gas absorption spectroscopy device for measuring a target component in a gas using a cavity ring-down spectroscopy method, the gas absorption spectroscopy device including: a resonator including at least two mirrors; a light source that emits laser light to irradiate the resonator with the laser light; a first detector that detects light from the resonator; an acousto-optic modulator disposed in an optical path between the light source and the resonator, the acousto-optic modulator being switchable between an ON state in which the laser light from the light source is output to the resonator and an OFF state in which the laser light from the light source is not output to the resonator; and a control unit that acquires, as a ring-down signal to be used to measure the target component, an output signal of the first detector after the acousto-optic modulator is switched from the ON state to the OFF state. The acousto-optic modulator outputs first order light to the resonator in the ON state, and outputs zeroth order light to the outside in the OFF state. The gas absorption spectroscopy device further includes a second detector that detects an intensity of the zeroth order light. The control unit determines a starting point of the ring-down signal based on an output signal of the second detector.

In the gas absorption spectroscopy device according to item 1, when the acousto-optic modulator is switched from the ON state to the OFF state, the first order light (light to be input to the resonator) of the acousto-optic modulator is decreased to become zero, whereas the zeroth order light of the acousto-optic modulator is increased in response to the decrease of the first order light and becomes maximum when the first order light becomes zero. In view of such a characteristic, the gas absorption spectroscopy device according to item 1 includes the second detector that detects the intensity of the zeroth order light of the acousto-optic modulator, and the starting point of the ring-down signal is determined based on the output signal of the second detector. Thus, it is determined whether or not the first order light to be input to the resonator is completely blocked based on the intensity of the zeroth order light, and the timing at which the first order light to be input to the resonator is completely blocked can be set as the starting point of the ring-down signal. Therefore, the starting point of the ring-down signal can be closer to the timing at which the complete light blocking by the acousto-optic modulator is actually started, than in the conventional case where the timing after the passage of the constant delay time from the time at which the output signal of the first detector (the intensity of the output light of the resonator) has exceeded the threshold value is set as the starting point of the ring-down signal. As a result, the S/N ratio of the ring-down signal can be improved.

(Item 2) In the gas absorption spectroscopy device according to item 1, when the output signal of the first detector reaches a first threshold value in a state in which the acousto-optic modulator is in the ON state, the control unit switches the acousto-optic modulator to the OFF state, and the control unit sets, as the starting point of the ring-down signal, a timing at which a detection value by the second detector satisfies a predetermined starting point condition after switching the acousto-optic modulator to the OFF state.

According to the gas absorption spectroscopy device according to item 2, when the output signal of the first detector (the output light of the resonator) reaches the first threshold value, it is determined that sufficient light is accumulated in the resonator, and the acousto-optic modulator can be switched to the OFF state. A point of time at which the intensity of the zeroth order light output from the acousto-optic modulator by switching the acousto-optic modulator to the OFF state satisfies the predetermined starting point condition can be set as the starting point of the ring-down signal.

(Item 3) In the gas absorption spectroscopy device according to item 2, the starting point condition is a condition that the output signal of the second detector reaches a second threshold value.

According to the gas absorption spectroscopy device according to item 3, the timing at which the output signal (the intensity of the zeroth order light) of the second detector reaches the second threshold value can be determined as the timing at which the light to be input to the resonator is completely blocked, and can be set as the starting point of the ring-down signal.

(Item 4) The gas absorption spectroscopy device according to item 2 further includes a differentiation circuit that outputs a value obtained by differentiating the output signal of the second detector. The starting point condition is a condition that the output signal of the differentiation circuit is changed in a predetermined manner.

According to the gas absorption spectroscopy device according to item 4, the point of time at which the differential value of the intensity of the zeroth order light is changed in the predetermined manner is determined as the timing at which the light to be input to the resonator is completely blocked, and can be set as the starting point of the ring-down signal.

(Item 5) The gas absorption spectroscopy device according to any one of items 1 to 4 further includes a wavelength detection device that detects a wavelength of the zeroth order light.

In the gas absorption spectroscopy device according to item 5, by detecting the wavelength of the zeroth order light by the wavelength detection device, the wavelength of the light to be input to the resonator can be detected without splitting the first order light by a splitter or the like.

(Item 6) The gas absorption spectroscopy device according to any one of items 1 to 4 is configured to measure a concentration of $^{14}CO_2$, which is a radioisotope of carbon dioxide.

According to the gas absorption spectroscopy device according to item 6, the concentration of $^{14}CO_2$ can be measured.

(Item 7) In the gas absorption spectroscopy device according to any one of items 1 to 4, saturated absorption is caused in a gas provided in the resonator. The control unit measures a concentration of the target component using the cavity ring-down spectroscopy method that employs the saturated absorption by the gas provided in the resonator.

According to the gas absorption spectroscopy device according to item 7, transition of the ring-down signal due to the saturated absorption can be more appropriately measured.

Although the embodiments of the present invention have been described and illustrated in detail, it is clearly understood that the same is by way of illustration and example only and is not to be taken by way of limitation. The scope of the present invention is defined by the terms of the claims, and is intended to include any modifications within the scope and meaning equivalent to the terms of the claims.

What is claimed is:

1. A gas absorption spectroscopy device for measuring a target component in a gas using a cavity ring-down spectroscopy method, the gas absorption spectroscopy device comprising:

a resonator including at least two mirrors;

a light source that is configured to emit laser light to irradiate the resonator with the laser light;

a first detector that is configured to detect light from the resonator;

an acousto-optic modulator disposed in an optical path between the light source and the resonator, the acousto-optic modulator configured to be switchable between an ON state in which the laser light from the light source is output to the resonator and an OFF state in which the laser light from the light source is not output to the resonator; and a controller that is configured to acquire, as a ring-down signal to be used to measure the target component, an output signal of the first detector after the acousto-optic modulator is switched from the ON state to the OFF state, wherein the acousto-optic modulator is configured to output first order light to the resonator in the ON state and outputs zeroth order light to the outside in the OFF state, the gas absorption spectroscopy device further comprising a second detector that is configured to detect an intensity of the zeroth order light, wherein the controller is configured to determine a starting point of the ring-down signal based on an output signal of the second detector, wherein when the output signal of the first detector reaches a first threshold value in a state in which the acousto-optic modulator is in the ON state, the controller is configured to switch the acousto-optic modulator to the OFF state, and the controller is configured to set, as the starting point of the ring-down signal, a timing at which a detection value by the second detector satisfies a predetermined starting point condition after switching the acousto-optic modulator to the OFF state.

2. The gas absorption spectroscopy device according to claim 1, wherein the starting point condition is a condition that the output signal of the second detector reaches a second threshold value.

3. The gas absorption spectroscopy device according to claim 1, further comprising a differentiation circuit that is configured to output a value obtained by differentiating the output signal of the second detector, wherein the starting point condition is a condition that the output signal of the differentiation circuit is changed in a predetermined manner.

4. The gas absorption spectroscopy device according to claim 1, further comprising a wavelength detection device that is configured to detect a wavelength of the zeroth order light.

5. The gas absorption spectroscopy device according to claim 1, wherein the gas absorption spectroscopy device is configured to measure a concentration of $^{14}CO_2$, which is a radioisotope of carbon dioxide.

6. The gas absorption spectroscopy device according to claim 1, wherein saturated absorption is caused in a gas provided in the resonator, the controller is configured to measure a concentration of the target component using the cavity ring-down spectroscopy method that employs the saturated absorption by the gas provided in the resonator.

* * * * *